United States Patent
Wake

(10) Patent No.: US 10,359,171 B2
(45) Date of Patent: Jul. 23, 2019

(54) HEAT RAY ABSORBING LAMP COVER

(71) Applicant: Sumitomo Chemical Company, Limited, Tokyo (JP)

(72) Inventor: Takao Wake, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/538,871

(22) PCT Filed: Dec. 18, 2015

(86) PCT No.: PCT/JP2015/085545
§ 371 (c)(1),
(2) Date: Jun. 22, 2017

(87) PCT Pub. No.: WO2016/104375
PCT Pub. Date: Jun. 30, 2016

(65) Prior Publication Data
US 2017/0343183 A1    Nov. 30, 2017

(30) Foreign Application Priority Data

Dec. 25, 2014 (JP) ................. 2014-263267

(51) Int. Cl.
| | | |
|---|---|---|
| *F21S 45/47* | (2018.01) | |
| *C09K 3/00* | (2006.01) | |
| *F21V 3/00* | (2015.01) | |
| *F21V 3/04* | (2018.01) | |
| *F21S 41/20* | (2018.01) | |
| *F21S 43/20* | (2018.01) | |
| *C08K 3/22* | (2006.01) | |
| *G02B 5/22* | (2006.01) | |
| *G02B 5/20* | (2006.01) | |
| *G02B 27/00* | (2006.01) | |
| *B60Q 1/00* | (2006.01) | |

(52) U.S. Cl.
CPC ............ *F21S 45/47* (2018.01); *C08K 3/22* (2013.01); *C09K 3/00* (2013.01); *F21S 41/285* (2018.01); *F21S 43/26* (2018.01); *F21V 3/00* (2013.01); *F21V 3/04* (2013.01); *G02B 5/208* (2013.01); *G02B 5/22* (2013.01); *G02B 27/0006* (2013.01); *B60Q 1/0017* (2013.01); *C08K 2003/2258* (2013.01); *C08K 2201/011* (2013.01)

(58) Field of Classification Search
USPC .................. 252/500; 525/185, 228; 524/523
See application file for complete search history.

(56) References Cited

U.S. PATENT DOCUMENTS

2012/0157587 A1    6/2012  Meyer et al.

FOREIGN PATENT DOCUMENTS

| EP | 2537898 A1 | | 12/2012 |
|---|---|---|---|
| JP | H05-163408 A | | 6/1993 |
| JP | 2003-007105 A | | 1/2003 |
| JP | 2006-219662 A | | 8/2006 |
| JP | 2007-231092 A | | 9/2007 |
| JP | 2007231092 | * | 9/2007 |
| JP | 2011-001425 A | | 1/2011 |
| JP | 2012-082326 | * | 4/2012 |
| JP | 2012-082326 A | | 4/2012 |

OTHER PUBLICATIONS

Int'l Preliminary Report on Patentability dated Mar. 15, 2016 in Int'l Application No. PCT/JP2015/085545.
Int'l Search Report dated Mar. 15, 2016 in Int'l Application No. PCT/JP2015/085545.
Office Action dated Jan. 9, 2018 in JP Application No. 2016566316.
Office Action dated May 8, 2018 in JP Application No. 2016566316.
European Search Report dated Jul. 18, 2018 in EP Application No. 15872943.4.
Office Action dated Dec. 29, 2018 in CN Application No. 201580070769.3.

\* cited by examiner

*Primary Examiner* — Monique R Peets
(74) *Attorney, Agent, or Firm* — Panitch Schwarze Belisario & Nadel LLP

(57) ABSTRACT

There is provided a heat ray absorbing lamp cover that exhibits excellent transparency and antifogging property to light sources that causes less temperature rise of a cover due to lamp irradiation, such as an LED light source and a semiconductor laser. The heat ray absorbing lamp cover has an average visible light transmittance of 75% or more, an average near-infrared light transmittance of 75% or less, and a haze of 3.0% or less.

20 Claims, 1 Drawing Sheet

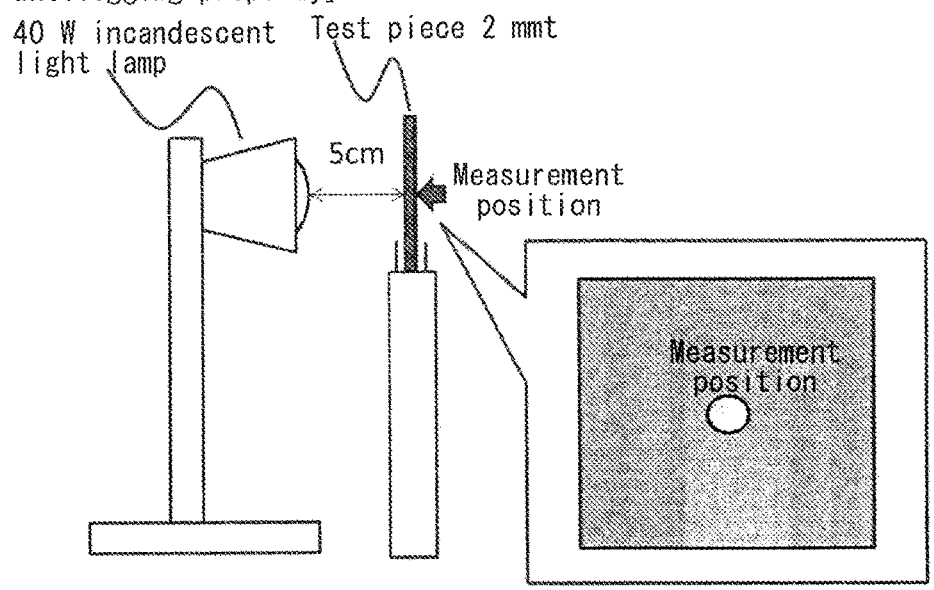

ed States Patent 10,359,171 B2

HEAT RAY ABSORBING LAMP COVER

CROSS-REFERENCE TO RELATED APPLICATION

This application is a Section 371 of International Application No. PCT/JP2015/085545, filed Dec. 18, 2015, which was published in the Japanese language on Jun. 30, 2016, under International Publication No. WO 2016/104375 A1, and the disclosure of which is incorporated herein by reference.

TECHNICAL FIELD

The present invention relates to a heat ray absorbing lamp cover that exhibits excellent transparency and antifogging property to a light source that causes less temperature rise of the cover due to the lamp irradiation, such as an LED light source and a semiconductor laser.

BACKGROUND ART

A methacrylic resin known as a thermoplastic resin is used as a raw material for vehicle members, such as a tail lamp cover and a meter panel, etc. because the methacrylic resin exhibits excellent transparency and weather resistance. An aromatic polycarbonate resin is also used as a raw material for vehicle members, such as a head lamp cover, etc. because the aromatic polycarbonate resin is a thermoplastic resin that exhibits excellent transparency, heat resistance and impact resistance. It is known that such tail lamp covers and head lamp covers are covered with an antifogging coat film on a lamp chamber side of a lens so that the inside of the lamp is not fogged (see Patent Literature 1).

PRIOR ART LITERATURE

Patent Literature

Patent Literature 1: JP 2003-7105 A

SUMMARY OF INVENTION

Technical Problem

If the antifogging performance can be imparted to a tail lamp cover and a head lamp cover themselves without requiring the lamp covers covered with the antifogging coat, a manufacturing process of the lamp cover can be simplified, and the lamp can also be manufactured at lower cost. For this purpose, a lamp cover without an antifogging coat is desired. In recent years, LED lamps and semiconductor lasers are being used in place of conventional halogen lamps as a light source of the lamp. For example, in an LED lamp, temperature rise of a lamp cover caused by the irradiation of the lamp is suppressed. As a result, dew condensation is likely to occur inside the lamp cover. Therefore, temperature rise of the lamp cover by sunlight (heat ray) is required in order to increase the temperature of the lamp cover using an LED light source, and thus a lamp cover capable of absorbing a heat ray is required.

An object of the present invention is to provide a heat ray absorbing lamp cover that exhibits excellent transparency and antifogging property to a light source that causes less temperature rise of a cover due to lamp irradiation, such as an LED light source and a semiconductor laser.

Solution to Problem

The present inventors have studied earnestly to solve the above problem. As a result, the present inventors have found that the above-mentioned object can be achieved by means described below, and finally accomplished the present invention.

That is, the present invention includes the following preferred aspects.

[1] A heat ray absorbing lamp cover having an average visible light transmittance of 75% or more, an average near-infrared light transmittance of 75% or less, and a haze of 3.0% or less.

[2] The heat ray absorbing lamp cover according to above [1], wherein the heat ray absorbing lamp cover is formed of a resin composition comprising an inorganic infrared-ray shielding material in a ratio of 1 to 5000 ppm by mass to 100 parts by mass of a thermoplastic resin.

[3] The heat ray absorbing lamp cover according to above [2], wherein the thermoplastic resin is an acrylic resin and/or an aromatic polycarbonate resin.

[4] The heat ray absorbing lamp cover according to above [2] or [3], wherein the inorganic infrared-ray shielding material is a composite tungsten oxide fine particle represented by a general formula:

where M represents at least one element selected from the group consisting of H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, x, y and z are numbers satisfying the following formulas:

$0.01 \leq x \leq 1$ $0.001 \leq x/y \leq 1$ and $2.2 \leq z/y \leq 3.0$.

[5] The heat ray absorbing lamp cover according to above [4], wherein the composite tungsten oxide fine particle has an average particle diameter of 1 nm to 800 nm.

[6] The heat ray absorbing lamp cover according to above [4] or [5], wherein the M represents at least one element selected from the group consisting of Li, Na, K, Rb, Cs, Mg, Ca, Sr and Ba.

[7] The heat ray absorbing lamp cover according to any one of above [4] to [6], wherein the composite tungsten oxide particle is covered with a dispersant.

Advantageous Effects of Invention

According to the heat ray absorbing lamp cover of the present invention, it is possible to obtain an effect of exhibiting excellent transparency and antifogging property to a light source that causes less temperature rise of a cover due to lamp irradiation, such as an LED light source and a semiconductor laser.

BRIEF DESCRIPTION OF DRAWINGS

FIG. 1 illustrates a method for determining an antifogging property by use of a contact type thermometer in the present specification.

DESCRIPTION OF EMBODIMENTS

In an embodiment of the present invention, a heat ray absorbing lamp cover has an average visible light transmittance of 75% or more, an average near-infrared light transmittance of 75% or less, and a haze of 3.0% or less. In the embodiment of the present invention, the heat ray absorbing lamp cover can be formed of a resin composition comprising a thermoplastic resin and an inorganic infrared-ray shielding material.

(Thermoplastic Resin)

The thermoplastic resin as a base material of a thermoplastic resin composition constituting the heat ray absorbing lamp cover according to the present invention is not particularly limited as far as it is a transparent thermoplastic resin having higher light transmittance in the visible light region, and includes, for example, a thermoplastic resin having a haze of 30% or less according to JIS K 7105 and a visible light transmittance of 50% or more according to JIS R 3106 when the thermoplastic resin is formed into a plate-like molded body having a thickness of 2 mm. Specifically, it is selected from thermoplastic resins exemplified by acrylic resins (resins obtained from a monomer component comprising an acrylic acid monomer and/or a methacrylic acid monomer, which can also be expressed as (meth)acrylic resins), aromatic polycarbonate resins, polyether imide resins, polyester resins and the like, polystyrene resins, polyether sulfone resins, fluorine-based resins and polyolefin resins, depending on desired characteristics, and may be a single resin or a mixture of two or more resins. Among them, acrylic resins, especially methacrylic resins are preferable from a viewpoint of transparency and weather resistance. Aromatic polycarbonate resins are preferable from a viewpoint of heat resistance and impact resistance.

(Methacrylic Resin)

The methacrylic resin which can be used as the thermoplastic resin in the present invention is preferably obtained by polymerizing a monomer component comprising methyl methacrylate and acrylic acid ester. A mass ratio of methyl methacrylate, acrylic acid ester and the like can be appropriately selected. The mass ratio is preferably a mass ratio where methyl methacrylate accounts for 85 to 100 parts by mass and a monomer comprising mainly acrylic acid ester accounts for 0 to 15 parts by mass, and more preferably a mass ratio where methyl methacrylate accounts for 90 to 100 parts by mass and a monomer comprising mainly acrylic acid ester accounts for 0 to 10 parts by mass. The heat resistance of the methacrylic resin can be improved by adjusting the amounts of the monomer such as acrylic acid ester to within the above-mentioned range.

Examples of the acrylic acid ester include methyl acrylate, ethyl acrylate, propyl acrylate, n-butyl acrylate, sec-butyl acrylate, tert-butyl acrylate, cyclohexyl acrylate, and 2-ethylhexyl acrylate. Among them, methyl acrylate and ethyl acrylate are preferable. Only a single acrylic acid ester may be used, or two or more acrylic acid esters may be used.

The method for polymerizing the monomer component is not particularly limited, and for example, a known polymerization method such as suspension polymerization, solution polymerization and mass polymerization can be employed. Among them, mass polymerization is preferable. Any of a batch-wise polymerization and a continuous polymerization can be employed as the mass polymerization. For example, a polymer can be obtained with high productivity by a method of retaining the monomer component, a polymerization initiator and the like in a reaction vessel for a predetermined time while continuously supplying the monomer component, the polymerization initiator and the like into the reaction vessel, and continuously drawing obtained partial polymer.

The polymerization initiator used when polymerizing the monomer component is not particularly limited, and a known radical polymerization initiator, for example, azo compounds such as azobisisobutyronitrile; and peroxides such as 1,1-di(t-butylperoxy)cyclohexane can be used. Only a single polymerization initiator may be used, or two or more polymerization initiators may be used.

When the monomer component is polymerized, a chain transfer agent can be used, if necessary. The chain transfer agent is not particularly limited, and preferable examples thereof include mercaptans such as n-butyl mercaptan, n-octyl mercaptan, n-dodecyl mercaptan and 2-ethylhexyl thioglycolate. Only a single chain transfer agent may be used, or two or more chain transfer agents may be used.

The molecular weight distribution index represented by (weight average molecular weight)/(number average molecular weight) of the methacrylic resin used in the present invention is not particularly limited, and preferably 1.8 to 6.0. In particular, it is difficult to obtain a methacrylic resin having a molecular weight distribution index of 2.2 or more by common radical polymerization. Thus, a known polymerization method such as a method using a plurality of radical polymerization initiators, a method using a plurality of chain transfer agents, a method of combining multiple stages of polymerization processes, etc. is preferably used.

The methacrylic resin having a molecular weight distribution index of 2.2 or more as described above may also be prepared by mixing two or more methacrylic resins having different weight average molecular weights. The method of mixing is not particularly limited, and a melt-kneading method, a solvent kneading method, a dry blending method, etc. is used. From a viewpoint of productivity, the melt-kneading method and the dry blending method are preferably used. A common mixer, kneading machine or the like can be used as an apparatus used for mixing. Specific examples thereof include a single screw kneading extruder, a twin screw kneading extruder, a ribbon blender, a Henschel mixer, a Banbury mixer, and a drum tumbler.

The metacrylic resin used in the present invention may contain various additives such as, for example, an antioxidant, a stabilizer, an ultraviolet absorber, a lubricant, a processing aid, an antistatic agent, a coloring agent, an impact-resistant aid, a foaming agent, a filler and a matting agent, if necessary.

(Aromatic Polycarbonate Resin)

Examples of the aromatic polycarbonate resin which can be used as the thermoplastic resin in the present invention include, for example, a resin obtained by reacting a dihydric phenol and a carbonylation agent by an interfacial polycondensation method, a melt transesterification method, or the like; a resin obtained by polymerizing a carbonate prepolymer by a solid-phase transesterification method or the like; and a resin obtained by polymerizing a cyclic carbonate compound by a ring-opening polymerization method.

Examples of the dihydric phenol include hydroquinone, resorcinol, 4,4'-dihydroxydiphenyl, bis(4-hydroxyphenyl) methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (commonly known as bisphenol A), 2,2-bis{(4-hydroxy-3-methyl)phenyl}propane, 2,2-bis{(4-hydroxy-3,5-dimethyl) phenyl}propane, 2,2-bis{(4-hydroxy-3,5-dibromo) phenyl}propane, 2,2-bis{(3-isopropyl-4-hydroxy) phenyl}propane, 2,2-bis{(4-hydroxy-3-phenyl) phenyl}propane, 2,2-bis(4-hydroxyphenyl)butane, 2,2-bis (4-hydroxyphenyl)-3-methylbutane, 2,2-bis(4-hydroxyphenyl)-3,3-dimethylbutane 2,4-bis(4- hydroxyphenyl)-2-methylbutane, 2,2-bis(4-hydroxyphenyl) pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenyl sulfone, 4,4'-dihydroxydiphenylsulfoxide, 4,4'-dihydroxydiphenylsulfide, 4,4'-dihydroxydiphenyl ketone, 4,4'-dihydroxydiphenyl ether, and 4,4'-dihydroxydiphenyl ester. These may be used singly or in combination.

Among these dihydric phenols, bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α,α'-bis(4-hydroxyphenyl)-m-diisopropylbenzene are preferable. In particular, it is preferable to use bisphenol A alone or use bisphenol A in combination with at least one selected from a group consisting of 1,1-bis(4-hydroxyphenyl)-3,3,5-trimethylcyclohexane, 2,2-bis{(4-hydroxy-3-methyl)phenyl}propane and α,α'-bis(4-hydroxyphenyl)-m-diisopropylbenzene.

Examples of the carbonylation agent include carbonyl halides (such as phosgene), carbonate esters (such as diphenyl carbonate), and haloformates (such as dihaloformate as dihydric phenol). These may be used alone or in combination.

The aromatic polycarbonate resin may contain an additive such as a release agent, an ultraviolet absorber, a dye, a pigment, a polymerization inhibitor, an antioxidant, a flame retardant, and a reinforcing material as far as the additive does not impair the effect of the present invention.

(Inorganic Infrared-Ray Shielding Material)

The heat ray absorbing lamp cover according to the present invention is preferably formed of a resin composition containing the inorganic infrared-ray shielding material in a ratio of 1 to 5000 ppm by mass to 100 parts by mass of the thermoplastic resin from a viewpoint of an infrared-ray shielding performance and a haze.

An inorganic particle (including a composite tungsten oxide fine particle described later) contained in the inorganic infrared-ray shielding material used in the present invention usually has an average particle diameter of 1 nm to 800 nm, preferably 1 nm to 500 nm, more preferably 1 nm to 300 nm, and furthermore preferably 1 nm to 100 nm. When the average particle diameter is 1 nm or more, an aggregation effect can be suppressed so that dispersion failure can be effectively prevented. When the average particle diameter is 500 nm or less, increasing in haze of a transparent resin molded article can be prevented effectively. In the present invention, the average particle diameter of the inorganic particle means a dispersion particle diameter thereof when the inorganic particle is dispersed. The average particle diameter (dispersion particle diameter) of the inorganic particle can be determined using a variety of commercially available particle size analyzers. For example, it can be determined by use of ESL-800 manufactured by Otsuka Electronics Co., Ltd. which employs a dynamic light scattering method as a principle. Examples of the inorganic infrared-ray shielding material include a tungsten-based inorganic infrared-ray shielding material, a lanthanum-based inorganic infrared-ray shielding material, a tin-based inorganic infrared-ray shielding material, and an antimony-based infrared-ray shielding agent. Among them, the tungsten-based inorganic infrared-ray shielding material is preferable from a viewpoint of infrared-ray shielding performance and haze. Among them, a composite tungsten oxide fine particle is particularly preferable.

(Composite Tungsten Oxide Fine Particle)

The composite tungsten oxide fine particle used in the present invention is preferably a composite tungsten oxide fine particle represented by a general formula:

$$M_xW_yO_z$$

where M represents at least one element selected from the group consisting of H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, x, y and z are numbers satisfying the following formulas:

$$0.01 \leq x \leq 1$$

$$0.001 \leq x/y \leq 1 \text{ and}$$

$$2.2 \leq z/y \leq 3.0.$$

Among them, M is preferably at least one element selected from the group consisting of Li, Na, K, Rb, Cs, Mg, Ca, Sr and Ba, and most preferably K, Rb or Cs. The range of x is preferably $0.01 \leq x \leq 0.5$ and more preferably $0.2 \leq x \leq 0.4$. Furthermore, the ranges of x/y and z/y are preferably $0.01 \leq x/y \leq 0.5$ and $2.7 \leq z/y \leq 3.0$, respectively, and more preferably $0.2 \leq x/y \leq 0.4$ and $2.8 \leq z/y \leq 3.0$, respectively.

The composite tungsten oxide fine particle can be obtained by subjecting a tungsten compound as a starting raw material to a heat treatment in an inert gas atmosphere or a reducing gas atmosphere. The composite tungsten oxide fine particle obtained through the heat treatment has a sufficient near-infrared-ray shielding power and preferable characteristics as the infrared-ray shielding fine particle.

The starting raw material of the composite tungsten oxide fine particle represented by a general formula  is a tungsten compound containing an element M in the form of a simple substance element or a compound. Specifically, it is preferably one or more selected from the group consisting of a tungsten trioxide powder; a tungsten dioxide powder; a tungsten oxide hydrate; a tungsten hexachloride powder; an ammonium tungstate powder; a tungsten oxide hydrate powder obtained by dissolving tungsten hexachloride into an alcohol and then drying it; a tungsten oxide hydrate powder obtained by dissolving tungsten hexachloride into an alcohol, then adding water to form precipitation and drying it; a tungsten compound powder obtained by drying an ammonium tungstate aqueous solution; and metal tungsten powder which contains the element M in the form of a simple substance element or a compound. It is furthermore preferable to use an ammonium tungstate aqueous solution and a tungsten hexachloride solution in light of the fact that each element can easily be mixed uniformly when the starting raw material is a solution. The above-mentioned composite tungsten oxide fine particle can be obtained by use of these raw materials by subjecting them to the heat treatment in an inert gas atmosphere or a reducing gas atmosphere.

In order to produce a tungsten compound as the starting raw material in which individual components are uniformly mixed at a molecular level, it is preferable to mix the individual raw materials in the form of solution, and the tungsten compound containing the element M is preferably capable of being dissolved into a solvent such as water and an organic solvent. Examples of such compounds include, but are not limited to, tungstate, chloride, nitrate, sulfate, oxalate, oxide, carbonate, and hydroxide which contain the element M, and any compound is preferable as long as it can be in the form of a solution.

The above-described raw material for producing the composite tungsten oxide fine particle will be described again in detail below.

As the raw material for obtaining the composite tungsten oxide fine particle represented by the general formula $M_xW_yO_z$, it is possible to use a powder obtained by mixing a powder of one or more selected from the group consisting of a tungsten trioxide powder, a tungsten dioxide powder, a tungsten oxide hydrate, a tungsten hexachloride powder, an ammonium tungstate powder, a tungsten oxide hydrate powder obtained by dissolving tungsten hexachloride into an alcohol and then drying it or a tungsten oxide hydrate powder obtained by dissolving tungsten hexachloride into an alcohol, then adding water to form precipitation and drying it, a tungsten compound powder obtained by drying an ammonium tungstate aqueous solution and a metal tungsten powder with a powder of the simple substance or compound containing the element M.

Furthermore, when the tungsten compound as the starting raw material for obtaining the composite tungsten oxide fine particle is a solution or a dispersed liquid, each element can easily be mixed uniformly.

From the above-described point of view, the starting raw material of the fine particle of the composite tungsten oxide is furthermore preferably a powder obtained by mixing an alcohol solution of tungsten hexachloride or an ammonium tungstate aqueous solution, with a solution of the compound containing the element M, and then drying them.

Similarly, the starting raw material of the fine particle of the composite tungsten oxide is also preferably a powder obtained by mixing a dispersed liquid obtained by dissolving tungsten hexachloride into an alcohol, then adding water to form a precipitation, with a powder of the simple substance or the compound containing the element M or a solution of the compound containing the element M, and then drying them.

Examples of the compound containing the element M include but are not limited to, tungstate, chloride, nitrate, sulfate, oxalate, oxide, carbonate, and hydroxide of the element M, and any compound is available as long as it can be in the form of a solution. Furthermore, in particular, when the composite tungsten oxide fine particles are industrially produced, a production method using tungsten oxide hydrate powder or tungsten trioxide and carbonate or hydroxide of the element M is preferably employed because the method does not generate a harmful gas or the like in a stage of the heat treatment, etc.

A heat treatment condition of the composite tungsten oxide fine particle in the inert atmosphere is preferably 650° C. or higher. The starting raw material subjected to the heat treatment at 650° C. or higher has a sufficient near-infrared-ray shielding power, and improves efficiency as the infrared-ray shielding fine particle. An inert gas such as Ar and $N_2$ are preferably used as the inert gas. As a heat treatment condition in the reducing atmosphere, it is preferable to firstly subject the starting raw material to the heat treatment at a temperature of from 100° C. to 850° C. in a reducing gas atmosphere, followed by the heat treatment at a temperature of from 650° C. to 1200° C. in an inert gas atmosphere. The reducing gas in this case is not particularly limited; however, $H_2$ is preferable. When $H_2$ is used as the reducing gas, the composition of the reducing atmosphere contains $H_2$ in a volume ratio of preferably 0.1% or more, and more preferably 2% or more. When the reducing atmosphere contains $H_2$ in a volume ratio of 0.1% or more, reduction can efficiently proceed.

The surface of the infrared-ray shielding material fine particle obtained by the above-mentioned process is preferably covered with an oxide containing one or more metals selected from the group consisting of Si, Ti, Zr and Al from a viewpoint of improving weather resistance. The covering method is not particularly limited, and the surface of the infrared-ray shielding material fine particle can be covered by adding an alkoxide of the above-mentioned metal into a solution in which the infrared-ray shielding material fine particle is dispersed.

The composite tungsten oxide fine particle is preferably covered with a dispersant. Examples of the dispersant include polymethyl methacrylate, polycarbonate, polysulfone, polyacrylonitrile, polyarylate, polyethylene, polyvinyl chloride, polyvinylidene chloride, fluorine resin, polyvinyl butyral, polyvinyl alcohol, polystyrene, silicone-based resin, and derivatives thereof. Effects of improving dispersibility upon added to the resin and preventing deterioration of the mechanical properties are obtained by the composite tungsten oxide fine particle covered with these dispersants. Examples of the method of covering with the dispersant include a method of dissolving and agitating the composite tungsten oxide fine particle and the dispersant in a solvent such as toluene to prepare a dispersed liquid, and then removing the solvent by a treatment such as vacuum drying to cover the composite tungsten oxide fine particle.

Examples of the method of adding the inorganic infrared-ray shielding material to the thermoplastic resin, especially acrylic resin include a method of directly adding the composite tungsten oxide fine particle or the covered composite tungsten oxide fine particle; and a method of adding it after preliminarily diluted with 1 to 100 times the amount of the thermoplastic resin, especially acrylic resin.

The inorganic infrared-ray shielding material is preferably compounded in the thermoplastic resin used in the present invention for the purpose of imparting heat ray absorbability. The inorganic infrared-ray shielding material used in the present invention is preferably a composite oxide composed of a tungsten oxide component and a cesium tungsten oxide. A preferred upper limit of the ratio of the inorganic infrared-ray shielding material to 100 parts by mass of the resin component is 5000 ppm by mass or less, preferably 3000 ppm by mass or less, and more preferably 2000 ppm by mass or less from a viewpoint of transparency and fine dispersibility. A preferred lower limit of the ratio is 10 ppm by mass or more, preferably 100 ppm by mass or more, and more preferably 20 ppm by mass or more from a viewpoint of heat ray absorbability.

The heat ray absorbing lamp cover according to the present invention has an average visible light transmittance of preferably 75% or more, and more preferably 80% or more. The average visible light transmittance is usually determined as a transmittance in a wavelength region of 380 to 780 nm in a state of a molded body having a thickness of 2 mm. The heat ray absorbing lamp cover according to the present invention has an average near-infrared light transmittance of preferably 75% or less, and more preferably 70% or less. The average near-infrared light transmittance is usually determined as a transmittance in a wavelength region of 800 nm to 2000 nm. The heat ray absorbing lamp cover according to the present invention preferably has excellent transparency and a haze of 3.0% or less. The haze is usually determined for a molded body having a thickness of 2 mm.

The inorganic infrared-ray shielding material reduces the light transmittance in the wavelength region of 800 to 2000 nm. Such shielding ability can also affect higher wavelength region in a visible-range band of less than 800 nm. As a result, the lamp cover looks bluish. In order to suppress this phenomenon, it is effective to adjust color by adding a small amount of a dye to the extent that the average transmittance in the visible-range band of 380 to 780 nm can be maintained at 75% or more. For example, an almost colorless lamp cover can be obtained by adding a red, orange or yellow dye in an amount such that the average light transmittance in the range of 380 to 780 nm is decreased by 1%.

Examples of a red-based dye include color index numbers S.R.143, D.R.191, S.R.146, S.R.145, S.R.150, S.R.149, S.R.135, S.R.179, S.R.151, S.R.52, and S.R.195. Examples of an orange-based dye include a color index number S.O.60. Examples of a yellow-based dye include color index numbers S.G.5, S.Y.16, S.Y.157, S.Y.33, and D.Y.54.

Although the type of the dye is not particularly limited, a dye which does not impair transparency, heat resistance and light resistance of the heat ray absorbing lamp cover is preferable. The added amount of the dye is preferably in a range of 0.1 to 10 parts by mass to 100 parts by mass of the composite infrared-ray shielding material fine particle. The added amount is preferably 10 parts by mass or less because the transmittance is not substantially reduced. The added amount is preferably 0.1 parts by mass or more because it can prevent the color tone from being bluish.

The heat ray absorbing lamp cover according to the present invention is usually obtained by injection molding. For details, the lamp cover according to the present invention can be obtained by use of the above-described thermoplastic resin or thermoplastic resin composition as a molding material and by filling (injecting) it into a mold in a molten state, then cooling the mold, and releasing the molded body from the mold. Specifically, for example, the lamp cover according to the present invention can be prepared by supplying the above-described methacrylic resin composition from a hopper, moving a screw backward while rotating the screw, metering the resin composition in a cylinder, melting the resin composition, filling the molten resin composition into the mold while applying pressure, holding the pressure for a certain time until the mold is sufficiently cooled, and then opening the mold to take out the molded body. Various conditions for preparing the lamp cover according to the present invention (for example, a melting temperature of the molding material, a temperature of the mold upon injecting the molding material into the mold, and a pressure upon holding the pressure after filling the resin composition in the mold) may be set appropriately and are not particularly limited.

Hereinafter, the present invention will be described in more detail with reference to Examples. However, the present invention is not limited thereby. Measurements of various physical properties of obtained resin composition and evaluations thereof were carried out by the following methods.

EXAMPLES

Example 1

An inorganic infrared-ray shielding material ["YMDS-874" manufactured by Sumitomo Metal Mining Co., Ltd. (an infrared-ray shielding agent consisting of about 23% by mass of $Cs_{0.33}WO_3$ (average particle diameter: 5 nm) and an organic dispersed resin)] was mixed into a methacrylic resin ("Sumipex MH" manufactured by Sumitomo Chemical Co., Ltd.) as the thermoplastic resin in a ratio of 1300 ppm by mass (about 300 ppm by mass of $Cs_{0.33}WO_3$ fine particles) (ratio to 100 parts by mass of the thermoplastic resin, the same shall apply hereinafter). Then, the thermoplastic resin was melt-kneaded by use of a single screw extruder (screw diameter: 40 mm) so that the resin temperature might be 250° C., and extruded into a strand, cooled with water and cut with a strand cutter to obtain pellets. Then, a 100 mm square flat plate having a thickness of 2 mm was prepared from the pellets by use of a heat compression molding machine at a molding temperature of 210° C. The inorganic particles (composite tungsten oxide fine particles) in the plate had a dispersion particle diameter of 70 nm.

Example 2

A flat plate was prepared in the same manner as Example 1 except that the inorganic infrared-ray shielding material "YMDS-874" was mixed in a ratio of 650 ppm by mass (about 150 ppm by mass of $Cs_{0.33}WO_3$ fine particles). The inorganic particles (composite tungsten oxide fine particles) in the plate had a dispersion particle diameter of 70 nm.

Example 3

A flat plate was prepared in the same manner as Example 1 except that the inorganic infrared-ray shielding material "YMDS-874" was mixed in a ratio of 330 ppm by mass (about 75 ppm by mass of $Cs_{0.33}WO_3$ fine particles). The inorganic particles (composite tungsten oxide fine particles) in the plate had a dispersion particle diameter of 70 nm.

Example 4

A flat plate was prepared in the same manner as Example 1 except that the inorganic infrared-ray shielding material "YMDS-874" was mixed in a ratio of 160 ppm by mass (about 37 ppm by mass of $Cs_{0.33}WO_3$ fine particles). The inorganic particles (composite tungsten oxide fine particles) in the plate had a dispersion particle diameter of 70 nm.

Comparative Example 1

The methacrylic resin ("Sumipex MH" manufactured by Sumitomo Chemical Co., Ltd.) as the thermoplastic resin was melted and kneaded by use of the single screw extruder (screw diameter: 40 mm) so that the resin temperature might be 250° C., and extruded into a strand, cooled with water and cut with the strand cutter to obtain pellets. Then, a 100 mm square flat plate having a thickness of 2 mm was prepared from the pellets by use of the heat compression molding machine at a molding temperature of 210° C.

Example 5

The inorganic infrared-ray shielding material ["YMDS-874" manufactured by Sumitomo Metal Mining Co., Ltd. (the infrared-ray shielding agent consisting of about 23% by mass of $Cs_{0.33}WO_3$ (average particle diameter: 5 nm) and the organic dispersed resin)] was mixed into an aromatic polycarbonate resin ("Calibre 301-40" manufactured by Sumika Styron Polycarbonate Limited) as the thermoplastic resin in a ratio of 1300 ppm by mass (about 300 ppm by mass of $Cs_{0.33}WO_3$ fine particles) (ratio to 100 parts by mass of the thermoplastic resin, the same shall apply hereinafter). Then, the thermoplastic resin was melted and kneaded by use of a single screw extruder (screw diameter: 20 mm) so that the resin temperature might be 240° C., and extruded into a strand, cooled with water and cut with the strand cutter to obtain pellets. Then, a 100 mm square flat plate having a thickness of 2 mm was prepared from the pellets by use of the heat compression molding machine at a molding temperature of 220° C. The inorganic particles (composite tungsten oxide fine particles) in the plate had a dispersion particle diameter of 70 nm.

Example 6

A flat plate was prepared in the same manner as Example 5 except that the inorganic infrared-ray shielding material "YMDS-874" was mixed in a ratio of 650 ppm by mass (about 150 ppm by mass of $Cs_{0.33}WO_3$ fine particles). The inorganic particles (composite tungsten oxide fine particles) in the plate had a dispersion particle diameter of 70 nm.

Example 7

A flat plate was prepared in the same manner as Example 5 except that the inorganic infrared-ray shielding material "YMDS-874" was mixed in a ratio of 260 ppm by mass (about 60 ppm by mass of $Cs_{0.33}WO_3$ fine particles). The inorganic particles (composite tungsten oxide fine particles) in the plate had a dispersion particle diameter of 70 nm.

Example 8

A flat plate was prepared in the same manner as Example 5 except that the inorganic infrared-ray shielding material "YMDS-874" was mixed in a ratio of 130 ppm by mass (about 30 ppm by mass of $Cs_{0.33}WO_3$ fine particles). The inorganic particles (composite tungsten oxide fine particles) in the plate had a dispersion particle diameter of 70 nm.

Comparative Example 2

The aromatic polycarbonate resin ("Calibre 301-40" manufactured by Sumika Styron Polycarbonate Limited) as the thermoplastic resin was melted and kneaded by use of the single screw extruder (screw diameter: 20 mm) so that the resin temperature might be 240° C., and extruded into a strand, cooled with water and cut with the strand cutter to obtain pellets. Then, 100 mm square flat plate having a thickness of 2 mm was prepared from the pellets by use of the heat compression molding machine at a molding temperature of 220° C.

Example 9

An inorganic infrared-ray shielding material ["KHDS-06" manufactured by Sumitomo Metal Mining Co., Ltd. (an infrared-ray shielding agent consisting of about 22% of $LaB_6$ and an organic dispersed resin)] and an inorganic infrared-ray shielding material ["FMDS-874" manufactured by Sumitomo Metal Mining Co., Ltd. (an infrared-ray shielding agent consisting of about 25% of ATO (antimony-doped tin oxide) and an organic dispersed resin)] were mixed into the methacrylic resin ("Sumipex MH" manufactured by Sumitomo Chemical Co., Ltd.) as the thermoplastic resin in ratios of 23.5 ppm by mass (about 5.1 ppm by mass of $LaB_6$ fine particles) and 766 ppm by mass (about 190 ppm by mass of ATO fine particles), respectively (ratios to 100 parts by mass of the thermoplastic resin, the same shall apply hereinafter). Then, the thermoplastic resin was melt-kneaded by use of the single screw extruder (screw diameter: 40 mm) so that the resin temperature might be 250° C., and extruded into a strand, cooled with water and cut with the strand cutter to obtain pellets. Then, a 100 mm square flat plate having a thickness of 2 mm was prepared from the pellets by use of the heat compression molding machine at a molding temperature of 210° C. The inorganic particles ($LaB_6$ fine particles and ATO fine particles) in the plate had a dispersion particle diameter (average dispersion particle diameter of two kinds of the inorganic particles) of 60 nm.

Example 10

A flat plate was prepared in the same manner as Example 9 except that the inorganic infrared-ray shielding materials "KHDS-06" and "FMDS-874" were mixed in ratios of 15.7 ppm by mass (about 3.4 ppm by mass of $LaB_6$ fine particles) and 516 ppm by mass (about 128 ppm by mass of ATO fine particles), respectively. The inorganic particles (two kinds of the inorganic particles, $LaB_6$ fine particles and ATO fine particles) in the plate had a dispersion particle diameter (average dispersion particle diameter of two kinds of the inorganic particles) of 60 nm.

Example 11

The inorganic infrared-ray shielding material ["YMDS-874" manufactured by Sumitomo Metal Mining Co., Ltd. (the infrared-ray shielding agent consisting of about 23% by mass of $Cs_{0.33}WO_3$ (average particle diameter: 5 nm) and the organic dispersed resin)] and a red dye ["Sumiplast Red H3G" manufactured by Sumika Chemtex Company, Limited (color index number: S.R.135)] were mixed into the methacrylic resin ("Sumipex MH" manufactured by Sumitomo Chemical Co., Ltd.) as the thermoplastic resin in ratios of 1300 ppm by mass (about 300 ppm by mass of $Cs_{0.33}WO_3$ fine particles) and 4.4 ppm by mass (ratios to 100 parts by mass of the thermoplastic resin, the same shall apply hereinafter). Then, the thermoplastic resin was melt-kneaded by use of the single screw extruder (screw diameter: 40 mm) so that the resin temperature might be 250° C., and extruded into a strand, cooled with water and cut with the strand cutter to obtain pellets. Then, a 100 mm square flat plate having a thickness of 2 mm was prepared from the pellets by use of the heat compression molding machine at a molding temperature of 210° C. The inorganic particles (composite tungsten oxide fine particles) in the plate had a dispersion particle diameter of 70 nm.

Example 12

A flat plate was prepared in the same manner as Example 11 except that the red dye ["Sumiplast Red H3G" manufactured by Sumika Chemtex Company, Limited (color index number: S.R.135)] was mixed in a ratio of 3.3 ppm by mass. The inorganic particles (composite tungsten oxide fine particles) in the plate had a dispersion particle diameter of 70 nm.

Example 13

A flat plate was prepared in the same manner as Example 11 except that the inorganic infrared-ray shielding material "YMDS-874" and the red dye ["Sumiplast Red H3G" manufactured by Sumika Chemtex Company, Limited (color index number: S.R.135)] were mixed in ratios of 1090 ppm by mass (about 250 ppm by mass of $Cs_{0.33}WO_3$ fine particles) and 3.5 ppm by mass, respectively. The inorganic particles (composite tungsten oxide fine particles) in the plate had a dispersion particle diameter of 70 nm.

Example 14

A flat plate was prepared in the same manner as Example 11 except that the inorganic infrared-ray shielding material "YMDS-874" and the red dye ["Sumiplast Red H3G" manufactured by Sumika Chemtex Company, Limited (color index number: S.R.135)] were mixed in ratios of 870 ppm by mass (about 200 ppm by mass of $Cs_{0.33}WO_3$ fine particles) and 2.9 ppm by mass, respectively. The inorganic particles (composite tungsten oxide fine particles) in the plate had a dispersion particle diameter of 70 nm.

<Average Visible Light Transmittance and Average Near-infrared Light Transmittance>

The light transmittance of the prepared flat plates at an optical path length of 2 mm was measured by use of a plastic characteristics measurement system (U-4000 type spectrophotometer) manufactured by Hitachi, Ltd. in a wavelength range of 300 nm to 2000 nm at every 5 nm. An average value of the obtained transmittance in a range of 380 nm to 780 nm was defined as "average visible light transmittance." An average value of the transmittance in a range of 800 nm to 2000 nm was defined as "average near-infrared light transmittance." An average value of the transmittance in a range of 400 nm to 480 nm was defined as "average blue light transmittance." "Degree of blueness" was calculated as ["average blue light transmittance"–"average visible light transmittance"]. Higher value of the degree of blueness means stronger blueness. The results are shown in Tables 1 to 4.

<Haze>

The haze of the flat plates with the thickness of 2 mm prepared as described above was determined according to JIS-K7136 by use of HR-100 manufactured by Murakami Color Research Laboratory.

<Evaluation of Antifogging Property>

A 100 mm square flat plate with a thickness of 2 mm was prepared by use of the heat compression molding machine at a molding temperature of 210° C. The flat plate (test piece having a thickness t=2 mm) was placed at a distance of 5 cm from a 40 W incandescent light bulb lamp as depicted in FIG. 1, and the temperature of the flat plate after irradiation for 1 hour was measured with the lamp remaining in a lighted state by use of a contact type thermometer. It can be said that the higher the surface temperature of the plate after irradiation is, the better the antifogging property is.

TABLE 1

| | | Example 1 | Example 2 | Example 3 | Example 4 | Comparative Example 1 |
|---|---|---|---|---|---|---|
| Average visible light transmittance (%) | | 81 | 87 | 89 | 90 | 91 |
| Average near-infrared light transmittance (%) | | 33 | 57 | 63 | 69 | 78 |
| Average blue light transmittance (%) | | 83 | 88 | 90 | 91 | 91 |
| Degree of blueness (%) | | 2 | 1 | 1 | 1 | 0 |
| Haze (%) | | 2.0 | 2.1 | 1.5 | 1.4 | 1.1 |
| Thermoplastic resin [SUMIPEX ®MH] (part by mass) | | 100 | 100 | 100 | 100 | 100 |
| Inorganic infrared-ray shielding material [YMDS-874] (ppm by mass) | | 1300 | 650 | 330 | 160 | 0 |
| Amount of $Cs_{0.33}WO_3$ fine particle (ppm by mass) | | 300 | 150 | 75 | 37 | 0 |
| Average particle diameter of composite tungsten oxide fine particle (nm) | | 70 | 70 | 70 | 70 | — |
| Evaluation of antifogging property | Surface temperature before irradiation (° C.) | 23 | 23 | 23 | 23 | 23 |
| | Surface temperature after irradiation for 1 h (° C.) | 61 | 59 | 56 | 53 | 51 |

TABLE 2

| | Example 5 | Example 6 | Example 7 | Example 8 | Comparative Example 2 |
|---|---|---|---|---|---|
| Average visible light transmittance (%) | 73 | 80 | 87 | 89 | 90 |
| Average near-infrared light transmittance (%) | 18 | 35 | 66 | 73 | 81 |
| Average blue light transmittance (%) | 78 | 83 | 88 | 89 | 89 |
| Degree of blueness (%) | 5 | 3 | 1 | 0 | −1 |
| Haze (%) | 4.0 | 4.4 | 3.2 | 3.5 | 3.4 |
| Thermoplastic resin [Calibre 301-40] (part by mass) | 100 | 100 | 100 | 100 | 100 |

TABLE 2-continued

|  | Example 5 | Example 6 | Example 7 | Example 8 | Comparative Example 2 |
|---|---|---|---|---|---|
| Inorganic infrared-ray shielding material [YMDS-874] (ppm by mass) | 1300 | 650 | 260 | 130 | 0 |
| Amount of $Cs_{0.33}WO_3$ fine particle (ppm by mass) | 300 | 150 | 60 | 30 | 0 |
| Average particle diameter of composite tungsten oxide fine particle (nm) | 70 | 70 | 70 | 70 | — |
| Evaluation of antifogging property — Surface temperature before irradiation (° C.) | 25 | 25 | 26 | 25 | 25 |
| Evaluation of antifogging property — Surface temperature after irradiation for 1 h (° C.) | 63 | 57 | 53 | 52 | 50 |

TABLE 3

|  | Example 9 | Example 10 | Comparative Example 1 |
|---|---|---|---|
| Average visible light transmittance (%) | 85 | 87 | 91 |
| Average near-infrared light transmittance (%) | 60 | 66 | 78 |
| Average blue light transmittance (%) | 84 | 86 | 91 |
| Degree of blueness (%) | −1 | −1 | 0 |
| Haze (%) | 2.4 | 2.1 | 1.1 |
| Thermoplastic resin [SUMIPEX ®MH] (part by mass) | 100 | 100 | 100 |
| Inorganic infrared-ray shielding material [KHDS-06] (ppm by mass) | 23.5 | 15.7 | — |
| Amount of $LaB_6$ fine particle (ppm by mass) | 5.1 | 3.4 | — |
| Inorganic infrared-ray shielding material [FMDS-874] (ppm by mass) | 766 | 516 | — |
| Amount of ATO fine particle (ppm by mass) | 190 | 128 | — |
| Average particle diameter of inorganic particle (nm) | 60 | 60 | — |
| Evaluation of antifogging property — Surface temperature before irradiation (° C.) | 23 | 23 | 23 |
| Evaluation of antifogging property — Surface temperature after irradiation for 1 h (° C.) | 56 | 53 | 51 |

TABLE 4

|  | Example 11 | Example 12 | Example 13 | Example 14 | Comparative Example 1 |
|---|---|---|---|---|---|
| Average visible light transmittance (%) | 82 | 81 | 84 | 85 | 91 |
| Average near-infrared light transmittance (%) | 37 | 35 | 44 | 50 | 78 |
| Average blue light transmittance (%) | 81 | 81 | 83 | 84 | 91 |
| Degree of blueness (%) | −1 | 0 | −1 | −1 | 0 |
| Haze (%) | 2.4 | 3.1 | 2.8 | 2.6 | 1.1 |
| Thermoplastic resin [SUMIPEX ® MH] (part by mass) | 100 | 100 | 100 | 100 | 100 |
| Inorganic infrared-ray shielding material [YMDS-874] (ppm by mass) | 1300 | 1300 | 1090 | 870 | 0 |
| Amount of $Cs_{0.33}WO_3$ fine particle (ppm by mass) | 300 | 300 | 250 | 200 | 0 |
| Red dye [Sumiplast ®Red H3G] (ppm by mass) | 4.4 | 3.3 | 3.5 | 2.9 | 0 |
| Average particle diameter of composite tungsten oxide fine particle (nm) | 70 | 70 | 70 | 70 | — |
| Evaluation of antifogging property — Surface temperature before irradiation (° C.) | 23 | 23 | 23 | 23 | 23 |
| Evaluation of antifogging property — Surface temperature after irradiation for 1 h (° C.) | 60 | 61 | 57 | 56 | 51 |

INDUSTRIAL APPLICABILITY

The heat ray absorbing lamp cover according to the present invention can be used as a cover for covering any light source. In particular, it can be suitably used as a cover for a light source causing less temperature rise of the cover due to lamp irradiation.

The present application claims priority to Japanese Patent Application No. 2014-263267 filed on Dec. 25, 2014. The contents of that application are incorporated herein by the reference thereto in their entirety.

The invention claimed is:

1. A heat ray absorbing lamp cover having an average visible light transmittance of 75% or more, an average near-infrared light transmittance of 75% or less, and a haze of 3.0% or less,
wherein the heat ray absorbing lamp cover comprises:
an inorganic infrared-ray shielding material comprising a composite tungsten oxide fine particle, and
at least one dye selected from the group consisting of a red dye, an orange dye and a yellow dye in a range of 0.1 to 10 parts by mass to 100 parts by mass of the composite tungsten oxide fine particle.

2. The heat ray absorbing lamp cover according to claim 1, wherein the heat ray absorbing lamp cover is formed of a resin composition comprising the inorganic infrared-ray shielding material in a ratio of 1 to 5000 ppm by mass to 100 parts by mass of a thermoplastic resin.

3. The heat ray absorbing lamp cover according to claim 2, wherein the thermoplastic resin is an acrylic resin and/or an aromatic polycarbonate resin.

4. The heat ray absorbing lamp cover according to claim 2, wherein the composite tungsten oxide fine particle is represented by a general formula:

$$M_xW_yO_z$$

where M represents at least one element selected from the group consisting of H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I,
x, y and z are numbers satisfying the following formulas:

$$0.01 \leq x \leq 1$$

$$0.001 \leq x/y \leq 1 \text{ and}$$

$$2.2 \leq z/y \leq 3.0.$$

5. The heat ray absorbing lamp cover according to claim 3, wherein the composite tungsten oxide fine particle represented by a general formula:

$$M_xW_yO_z$$

where M represents at least one element selected from the group consisting of H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I,
x, y and z are numbers satisfying the following formulas:

$$0.01 \leq x \leq 1$$

$$0.001 \leq x/y \leq 1 \text{ and}$$

$$2.2 \leq z/y \leq 3.0.$$

6. The heat ray absorbing lamp cover according to claim 4, wherein the composite tungsten oxide fine particle has an average particle diameter of 1 nm to 800 nm.

7. The heat ray absorbing lamp cover according to claim 5, wherein the composite tungsten oxide fine particle has an average particle diameter of 1 nm to 800 nm.

8. The heat ray absorbing lamp cover according to claim 4, wherein the M represents at least one element selected from the group consisting of Li, Na, K, Rb, Cs, Mg, Ca, Sr and Ba.

9. The heat ray absorbing lamp cover according to claim 5, wherein the M represents at least one element selected from the group consisting of Li, Na, K, Rb, Cs, Mg, Ca, Sr and Ba.

10. The heat ray absorbing lamp cover according to claim 6, wherein the M represents at least one element selected from the group consisting of Li, Na, K, Rb, Cs, Mg, Ca, Sr and Ba.

11. The heat ray absorbing lamp cover according to claim 7, wherein the M represents at least one element selected from the group consisting of Li, Na, K, Rb, Cs, Mg, Ca, Sr and Ba.

12. The heat ray absorbing lamp cover according to claim 4, wherein the composite tungsten oxide particle is covered with a dispersant.

13. The heat ray absorbing lamp cover according to claim 5, wherein the composite tungsten oxide particle is covered with a dispersant.

14. The heat ray absorbing lamp cover according to claim 6, wherein the composite tungsten oxide particle is covered with a dispersant.

15. The heat ray absorbing lamp cover according to claim 7, wherein the composite tungsten oxide particle is covered with a dispersant.

16. The heat ray absorbing lamp cover according to claim 8, wherein the composite tungsten oxide particle is covered with a dispersant.

17. The heat ray absorbing lamp cover according to claim 9, wherein the composite tungsten oxide particle is covered with a dispersant.

18. The heat ray absorbing lamp cover according to claim 10, wherein the composite tungsten oxide particle is covered with a dispersant.

19. The heat ray absorbing lamp cover according to claim 11, wherein the composite tungsten oxide particle is covered with a dispersant.

20. The heat ray absorbing lamp cover according to claim 1, wherein the heat ray absorbing lamp cover is a lamp cover for covering a light source selected from one of an LED light source and a semiconductor laser.

* * * * *